(12) United States Patent
Röhrig

(10) Patent No.: US 7,753,225 B2
(45) Date of Patent: Jul. 13, 2010

(54) VALVE ASSEMBLY

(75) Inventor: Peter Röhrig, Vienna (AT)

(73) Assignee: BAMED AG, Wollerau (CH)

( * ) Notice: Subject to any disclaimer, the term of this patent is extended or adjusted under 35 U.S.C. 154(b) by 1321 days.

(21) Appl. No.: 10/542,540

(22) PCT Filed: Dec. 23, 2003

(86) PCT No.: PCT/AT03/00382

§ 371 (c)(1),
(2), (4) Date: Jul. 18, 2005

(87) PCT Pub. No.: WO2004/064578

PCT Pub. Date: Aug. 5, 2004

(65) Prior Publication Data

US 2006/0113276 A1    Jun. 1, 2006

(30) Foreign Application Priority Data

Jan. 20, 2003    (AT) ................... A 66/2003

(51) Int. Cl.
A47G 19/22    (2006.01)
B65D 51/16    (2006.01)

(52) U.S. Cl. ............. 220/714; 220/203.28; 220/203.19

(58) Field of Classification Search ............. 220/715, 220/714, 711, 203.11, 203.01, 203.24, 203.23, 220/203.19, 202, 703; 215/388, 387, 260, 215/270, 271, 11.5, 11.4, 200; 222/532, 222/531, 544, 506; D7/397; D9/449
See application file for complete search history.

(56) References Cited

U.S. PATENT DOCUMENTS

| | | | |
|---|---|---|---|
| 1,972,344 A | | 9/1934 | Jackson |
| 2,319,849 A * | | 5/1943 | Crabbe ............ 215/260 |
| 2,411,216 A * | | 11/1946 | Leutz ............ 215/260 |
| 2,584,359 A | | 2/1952 | Miles |
| 2,610,755 A * | | 9/1952 | Gits ............ 215/11.5 |
| 3,232,499 A * | | 2/1966 | Esposito, Jr. ........ 222/499 |
| 4,415,097 A * | | 11/1983 | Meins ............ 220/711 |
| 4,747,518 A * | | 5/1988 | Laauwe ............ 222/153.14 |
| 5,240,149 A | | 8/1993 | Schmidt |
| 5,542,670 A | | 8/1996 | Morano |
| 5,687,882 A | | 11/1997 | Mueller |
| 5,747,083 A * | | 5/1998 | Raymond et al. ........ 426/117 |

(Continued)

FOREIGN PATENT DOCUMENTS

CH    426625    12/1964

(Continued)

OTHER PUBLICATIONS

Translation of Suffa et al. (WIPO Publication No. 95/26306), Oct. 5, 1995, pp. 1-2.*

*Primary Examiner*—Anthony Stashick
*Assistant Examiner*—Robert J Hicks
(74) *Attorney, Agent, or Firm*—Ladas & Parry LLP

(57) ABSTRACT

A valve assembly for an elastic mouthpiece for drinking from a liquid container. The valve assembly comprises a flexible membrane, having at least one valve opening, and a rigid membrane supporting element, which has at least one valve opening. The invention also relates to a mouthpiece for drinking from a liquid container that is provided with an inventive valve assembly, which is placed on a cap with an opening for the passage of liquid.

24 Claims, 4 Drawing Sheets

U.S. PATENT DOCUMENTS

| | | | |
|---|---|---|---|
| 5,924,605 A * | 7/1999 | Baudin et al. | 222/494 |
| 5,971,225 A * | 10/1999 | Kapsa | 222/212 |
| 6,223,956 B1 * | 5/2001 | Albers | 222/494 |
| 6,305,570 B1 | 10/2001 | Atkin et al. | |
| 6,321,931 B1 * | 11/2001 | Hakim et al. | 220/714 |
| 2002/0121531 A1 | 9/2002 | Panec et al. | |
| 2005/0173456 A1 * | 8/2005 | Backes | 222/212 |

FOREIGN PATENT DOCUMENTS

| | | |
|---|---|---|
| DE | 4440211 | 11/1994 |
| DE | 10109064 | 2/2001 |
| EP | 296004 | 12/1988 |
| JP | 46-37271 | 12/1971 |
| JP | 53-45155 | 4/1978 |
| JP | 08034452 | 2/1996 |
| JP | 11-509125 A | 8/1999 |
| JP | 2002-2755 A | 1/2002 |
| WO | WO 95/26306 | 10/1995 |
| WO | WO 99/47029 | 9/1999 |
| WO | WO 00/48491 | 8/2000 |
| WO | WO 02/22073 | 3/2002 |

\* cited by examiner

VALVE ASSEMBLY

The invention relates to a valve assembly for a substantially elastic drinking mouthpiece of a liquid container, which includes a flexible membrane having at least one valve opening and a substantially rigid membrane supporting element having at least one valve opening, wherein, with the valve assembly being in a closed position, the membrane rests on the membrane supporting element and the valve opening of the membrane is sealingly covered by the membrane supporting element and the valve opening of the membrane supporting element is sealingly covered by the membrane, the membrane being inwardly curved in said closed position.

The invention further relates to a drinking mouthpiece for a liquid container including a valve assembly, which drinking mouthpiece is arranged on a lid having an opening for the passage of liquid.

Various valve assemblies or drinking mouthpieces in which the liquid or liquid food is automatically prevented from flowing out in a position of non-use, yet a valve opening is automatically released when a user sucks on the drinking mouthpiece or a pressure is applied to the drinking mouthpiece have already been known from the prior art, particularly for children.

From U.S. Pat. No. 2,584,359 A, a bottle sucker in which a nipple having a valve opening rests on a valve seat in its position of non-use to close the valve opening in that position has already been known. If external pressure is applied to the nipple, the nipple will be lifted off the valve seat and the valve opening will, thus, be cleared. It involves the drawback of the nipple being made of an extremely elastic material and accordingly easily and involuntarily pressed down onto the valve seat in its position of use introduced in a mouth, so that no reliable clearance of the valve opening will be safeguarded during use.

A comparable assembly is further known from WO 00/48491 A1, which likewise discloses a drinking mouthpiece having a flexible cladding layer including a valve opening, which is arranged above a substantially rigid valve seat. Also that mouthpiece is to be lifted off the valve seat by the application of an underpressure during sucking, wherein the risk of the cladding layer being pressed back onto the valve seat by the tongue during a drinking movement and, hence, causing the valve opening to be inadvertently closed is still there because of the elasticity of the cladding layer.

From WO 02/22073 A1, a liquid container for children is, furthermore, known, which comprises a flexible mouthpiece in which a valve element is received in an inwardly displaceable manner such that a liquid channel is being released as pressure is applied to the mouthpiece, and the liquid channel is closed by the valve element in an unstressed position of the valve element. However, this involves the disadvantage of pressure being applied to the displaceably mounted, hard internal mouthpiece, which may sometimes be harmful to the user's teeth, particularly if used by yet unskilled children.

U.S. Pat. No. 6,223,956 B1 shows a self-closing valve to take liquid from a container, including a first membrane element and a second membrane element, wherein the first, upper membrane element is inwardly curved in the closed position and the second, lower membrane element is upwardly curved in the closed position, so that a liquid passage opening provided in the upper membrane element will be covered by the lower membrane element in the closed position. In the open position of the valve, the upper membrane element is lifted from the lower membrane element so as to release the liquid passage opening. To compensate the pressure, the lower membrane element is lifted downwardly from the upper membrane element so as to allow air to enter the liquid container.

From U.S. Pat. No. 1,972,344 A, a valve for closing a liquid dispenser of a tube container is known, in which a flexible membrane is mounted on a reception plate in a manner that a valve opening provided in the membrane will be covered by the plate in the closed position. In an open position, the membrane is lifted from the plate against a boundary wall so as to clear the valve opening.

EP 296 004 A1 likewise discloses a closure including a valve assembly for a liquid container, wherein a membrane having a valve opening is provided, which, in the closing position, is inwardly curved and rests on a supporting element. In the open position, the membrane is merely lifted off the supporting element to release the valve opening.

From WO 95/26306 A1, a closing cap of a liquid container including a sealing element having a valve opening is known, wherein the sealing element has an inwardly curved shape in its closed position and the valve opening is closed by an internally arranged supporting element. In the open position, the sealing element is merely lifted off the supporting element.

It is the object of the invention to provide a valve assembly for a drinking mouthpiece of the initially defined kind, which is reliably present in the open position releasing a valve opening during the external application of pressure to the drinking mouthpiece, or during sucking by a user, and hence provide a valve assembly that enables the interruption-free removal of liquid, and reliably prevents any escape of liquid in a position of non-use.

It is another object of the invention to provide a drinking mouthpiece exhibiting the afore-mentioned qualities.

In accordance with the invention, this is achieved in a valve assembly of the initially defined kind in that, during the external application of pressure to the drinking mouthpiece and/or the application of an underpressure at the membrane side facing away from the membrane supporting element, the membrane is in a resnapped, outwardly curved open position in which the valve openings of the membrane and membrane supporting element, respectively, are released.

Due to the inward curvature of the membrane in its closed position, and due to the membrane resnapping into an outwardly curved open position at the application of an underpressure and/or the external application of pressure to the drinking mouthpiece, the membrane will be in a comparably stable state in its open position during the suction procedure, in which the valve openings of the membrane and membrane supporting element will be reliably released so as to prevent the valve opening of the membrane from being immediately closed again by a slight, involuntary application of pressure to the membrane. Hence results a valve assembly that is particularly simple to handle and, in particular, enables the reliable removal of liquid, and which may be readily used even by children, who are not yet experienced in dealing with elastic drinking mouthpieces.

If the membrane is each substantially conical in its closed and open positions, a comparatively stable state of the membrane will result, whereby the conical membrane will be readily caused to resnap into its open position by the exertion of pressure to the drinking mouthpiece as well as the application of an underpressure.

In order to reliably ensure, in the closed position of the valve assembly, sealing between the valve openings provided in the membrane and in the membrane supporting element, respectively, it is advantageous if the membrane supporting element comprises a valve seat surface substantially corresponding with the inwardly curved shape of the membrane in its closed position.

If the drinking mouthpiece comprises a latch groove intended to receive the membrane supporting element configured as a latch body, the position of the membrane supporting element will be reliably fixed in the drinking mouthpiece, thus enabling the avoidance of involuntary displacements relative to the membrane, which may eventually lead to untightnesses in the closed position.

It is, furthermore, favorable if the membrane supporting element is connected with a fastening ring via a web in order to position the membrane supporting element in the drinking mouthpiece.

In order to provide high user comfort in the use of the drinking mouthpiece and, in addition, reach a particular orientation of the drinking mouthpiece within one's mouth during use, it is advantageous if the drinking mouthpiece is designed to be substantially oval in top view. However, it goes without saying that the drinking mouthpiece may have any other desired contour shape, shapes causing a particular orientation of the drinking mouthpiece during use being especially beneficial.

If the web used to fasten the membrane supporting element is designed in a plate-shaped manner with the plane defined by the plate-shaped web extending in the direction of the longer axis of the drinking mouthpiece in top view, biting of the soft drinking mouthpiece with teeth will be enabled, which will in turn facilitate drinking. Besides, the user's teeth will only contact the soft drinking mouthpiece after a fall, whereby injuries may be avoided. Moreover, the plate-shaped web, due to its plate-shaped configuration, will also exhibit a certain flexibility in the direction of the shorter axis of the drinking mouthpiece, thus further reducing the risk of injury, especially in case of a fall.

In order to reliably ensure the passage of liquid or liquid food through the membrane in its open position, it is advantageous if the membrane comprises several valve openings arranged along a circular line. In this context, it is additionally beneficial if the membrane supporting element comprises a substantially central valve opening.

In order to prevent the membrane from being inadvertently damaged, or inhibit a contact of the user's tongue with the membrane in its resnapped, open position, it is advantageous if the mouthpiece, formed as a drinking spout, extends beyond the membrane, whereby an elevated drinking spout edge is formed as a membrane protection and spacer element.

In order to obtain the desired, relatively soft drinking mouthpiece which will yield perpendicularly to the direction of its longitudinal extension after the application of pressure, it is beneficial if the drinking mouthpiece is made of an elastomer material and, in particular, a thermoplastic elastomer (TPE). It is, moreover, advantageous if the membrane supporting element is made of polypropylene (PP), since this will reliably help obtain a closure of the valve assembly in the inwardly curved closed position of the membrane.

The manufacture of the drinking mouthpiece of the initially defined kind will be feasible in a particularly simple manner, if the soft drinking mouthpiece, which is preferably made of a thermoplastic elastomer (TPE), is produced by a multi-component injection molding process in one piece with the hard lid, which is preferably made of polypropylene (PP). It is, of course, also feasible to make the membrane and the drinking mouthpiece of several components so as to enable a simple exchange of the membrane.

In order to safeguard the supply of air into the interior of a liquid container on which the lid including the drinking mouthpiece is placed, with said lid including an air valve having an annular membrane and at least one air passage opening, it is advantageous if a reception element including a peripheral groove that is open towards the inner side of the lid is fastened to the inner side of the lid and comprises at least one air entry opening communicating with the air passage opening of the lid and leading into the groove, wherein a ring is insertable or inserted in the groove and the air entry opening is sealed at equal pressures on either side of the air entry opening and at an overpressure at the inner side of the lid, due to the bias of at least one groove wall designed as an annular membrane, and the air entry opening is released at an underpressure at the inner side of the lid. Thus, a structurally simple air valve is created, by which, moreover, no complete pressure equalization occurs on account of the bias of the annular membrane, so that a certain residual vacuum remains within the liquid container on which the lid is placed, which residual vacuum, in turn, ensures the reliable, tight closure of the valve assembly provided as a drinking valve, as well as of the air valve, in the non-used state.

In order to provide a good sealing effect of the annular membrane resting on the ring in the non-used state, it is advantageous if the end region of the ring facing the air entry opening of the reception element in the inserted position of the ring is designed to be substantially conical in cross section.

If the the end region of the ring facing the air entry opening of the reception element in the inserted position of the ring comprises at least one recess alignedly arranged with the air passage and air entry openings in the inserted position of the ring, the unobstructed entry of air will be reliably ensured in an advantageous manner.

If the ring is fixable or fixed in the reception element by the aid of a snap connection, a structurally particularly simple connection to be produced in a cost-effective manner will be provided between the ring and the reception element.

In order to enable the inner groove wall to be designed as an annular membrane, it is favorable if the ring comprises on its outer side a circumferential bead for snapping into the groove of the reception element. This is of particular advantage, since the inner groove wall may, thus, be designed as an annular membrane and the air entering through the air valve will consequently be conducted directly into the interior of the liquid container.

If the annular membrane comprises at least one thin spot to fix the bias of the annular membrane, the residual vacuum left in the liquid container in the position of non-use may be fixed in a simple manner as a function of the size, number and wall thickness of the thin spots.

In order to secure the fasting ring for the web of the membrane supporting element of the valve assembly simultaneously with the assemblage of the air valve, it is advantageous if the fastening ring extending in the direction of the lid opening is connected with the ring via an inwardly extending connection flange.

If at least one ventilation aperture is provided in the connection flange, air entered through the air passage opening provided in the lid, and air entered through the air entry opening provided in the reception element, will be able to unhamperedly enter the interior of a liquid container on which a lid is placed.

In order to allow for that entry of air as unhampered as possible, it is advantageous if the ventilation aperture of the connection flange, in the inserted position of the ring, is located adjacent to the inner groove wall designed as an annular membrane.

In the following, the invention will be explained in more detail by way of a preferred exemplary embodiment illustrated in the drawing, to which it is, however, not limited. In detail:

Figure 1:
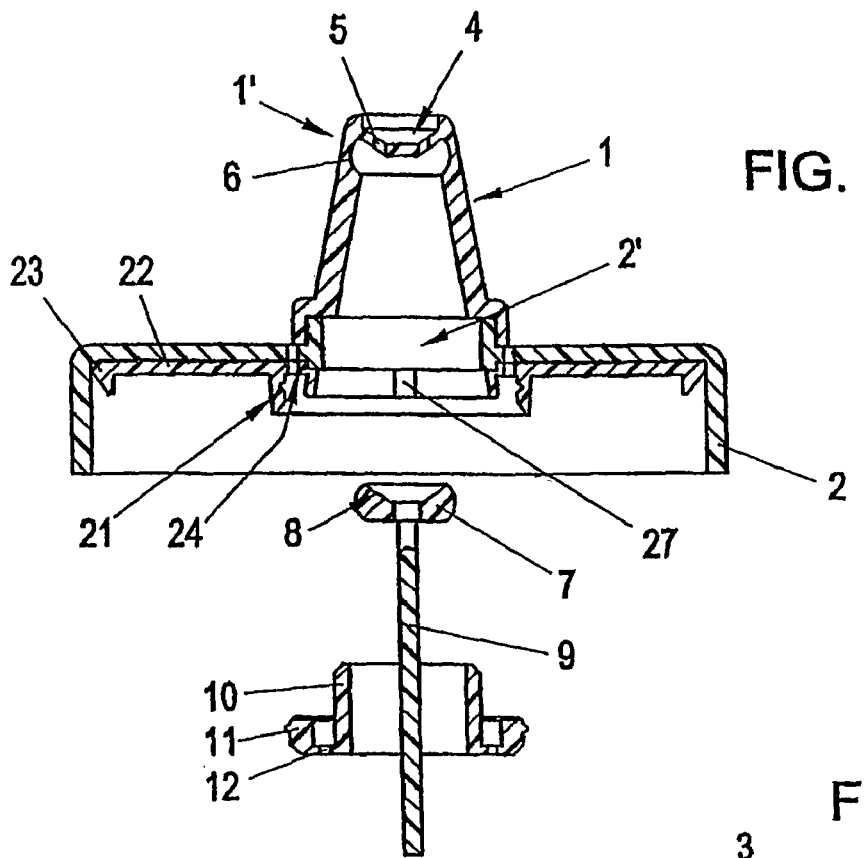
FIG. 1 is an exploded view of a drinking mouthpiece including a drinking valve and an air valve.

FIG. 1 depicts a soft drinking mouthpiece 1 made of a thermoplastic elastomer and placed on a lid 2 made of a hard synthetic material, for instance propylene, wherein the drinking mouthpiece 1, which follows upon a, for instance, central lid opening 2', and the lid 2 are produced in one piece by a two-component injection molding process. In the upper end portion 1' of the drinking mouthpiece 1, a valve assembly 3 (cf. FIGS. 2 and 3) including a flexible membrane 4 formed in one piece with the drinking mouthpiece 1 is provided as a drinking valve. The membrane 4 and the drinking mouthpiece 1 may, of course, also be composed of several parts so as to enable a simple exchange of the membrane.

Figure 4:
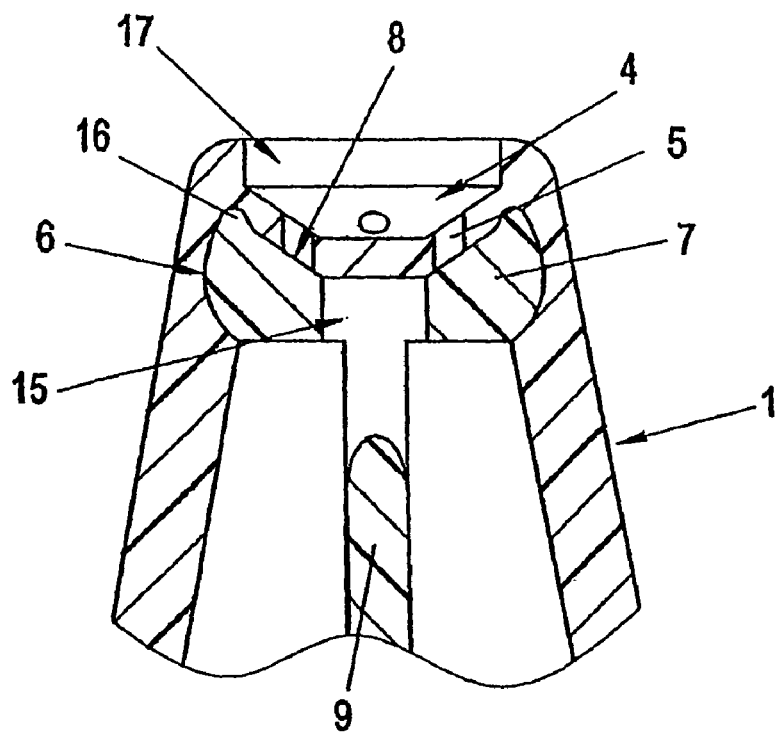
FIG. 4 is a detailed view of a section through the end portion of the drinking mouthpiece including a membrane in its closed position.
Figure 8:
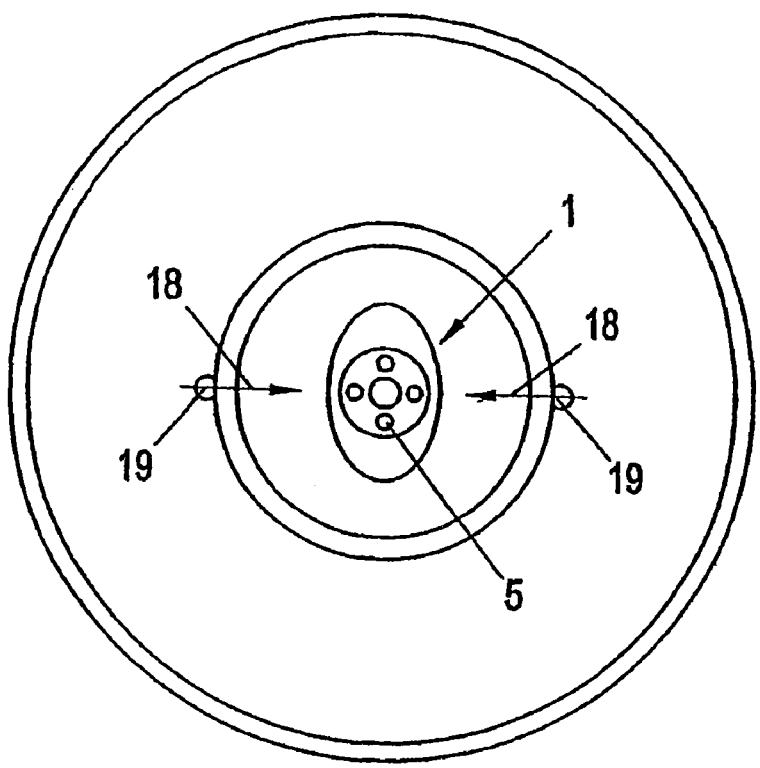
FIG. 8 is a top view on the lid including the drinking mouthpiece which is oval in cross section.

The membrane 4, in the unstressed, closed position illustrated in FIG. 1, has an inwardly curved conical shape and four valve openings 5 provided in its jacket surface along a circular line (cf. also FIGS. 4 and 8). Following the membrane 4, a latch groove 6 is provided in the interior of the drinking mouthpiece 1 to receive a membrane supporting element 7. The membrane supporting element 7 is designed in a substantially plate-shaped manner and provided with an upper valve seat surface 8 that is inwardly curved in accordance with the conical shape of the membrane 4.

The membrane supporting element 7 is connected with a fastening ring 10 via a plate-shaped web 9 to secure the membrane supporting element 7 to the lid 2.

Figure 2:
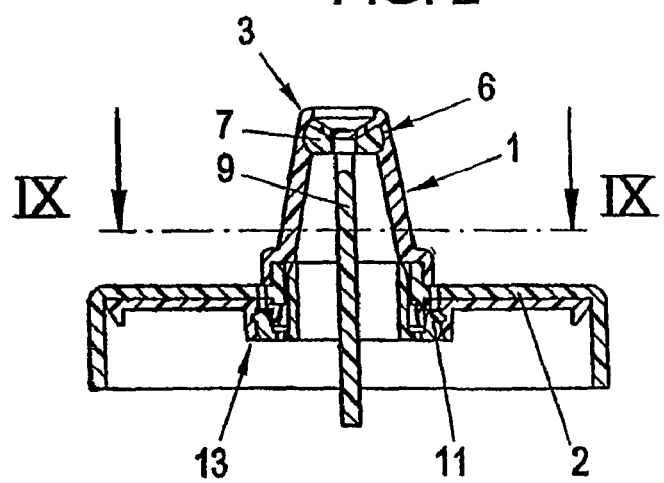
FIG. 2 is a cross-sectional view through a drinking mouthpiece according to FIG. 1 in its assembled state.
Figure 3:
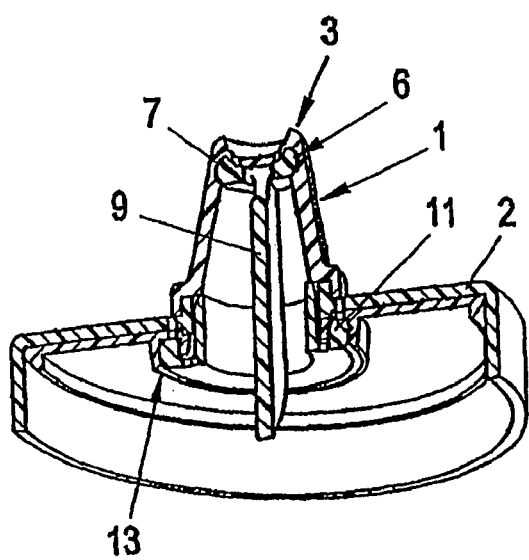
FIG. 3 is a perspective view of the drinking mouthpiece according to FIG. 2.

As is particularly apparent from FIGS. 2 and 3, in which the membrane supporting element 7 is shown in a position received in the latch groove 6 of the drinking mouthpiece 1, the insertion of a ring 11, which is connected with the fastening ring 10 of the plate-shaped web 9 via a connection flange 12, at the same time causes the formation of an air valve 13 and the fixation of the membrane reception element 7 in the drinking mouthpiece 1 for the formation of the drinking valve 3.

Figure 5:
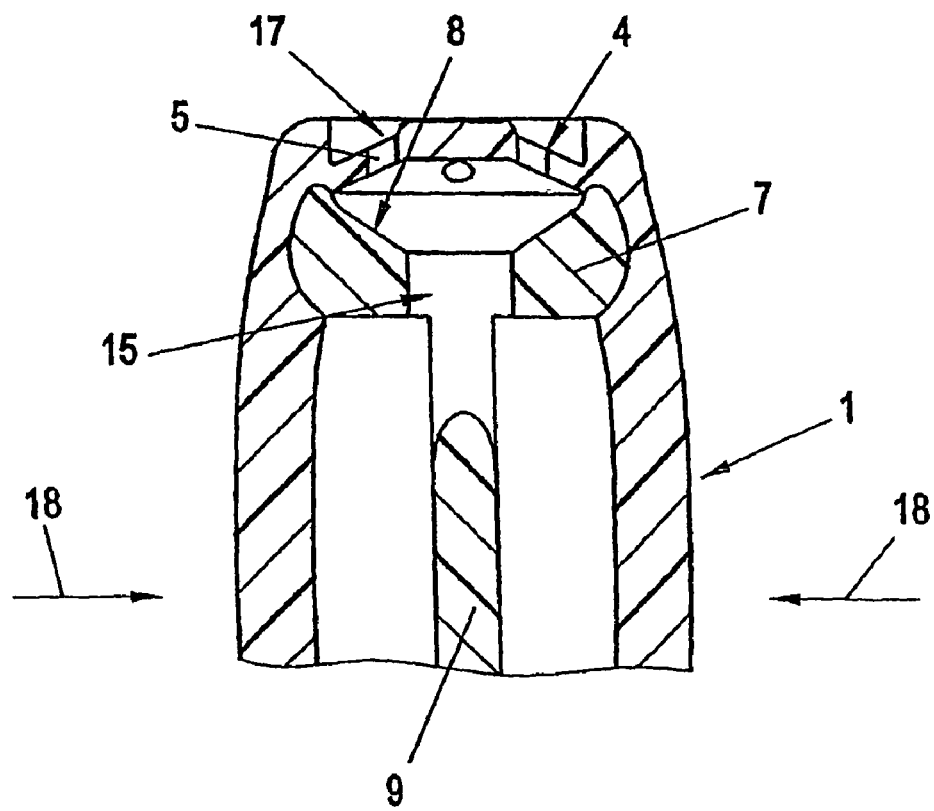
FIG. 5 is a detailed view of a section through the end portion of the drinking mouthpiece according to FIG. 4, yet with the membrane in the open position.

The mode of functioning of the valve assembly 3 configured as a drinking valve and including the membrane 4 and the membrane supporting element 7 is particularly apparent from the detailed views shown in FIGS. 4 and 5, the membrane 4 being shown in its inwardly curved, closed position in FIG. 4 and in its outwardly curved, open position in FIG. 5.

As is apparent from FIG. 4, the valve openings 5 of the membrane 4 in their closed positions rest on the full-surface valve seat surface 8 of the membrane supporting element 7 and a central valve opening 15 of the supporting element 7 is covered by the end face of the conical membrane 4 so as to prevent the passage of liquid in the closed position of the membrane 4.

Furthermore, FIG. 4 depicts a detail of the latch groove 6 of the elastic drinking mouthpiece 1, in which the membrane supporting element 7 is received by a snap-in connection. The membrane 4 borders immediately on the latch groove 6, an annular latch tongue 16 of the membrane supporting element 7 forming kind of a tilting surface to enable the membrane 4 to resnap from its inwardly curved, closed position into its outwardly curved, open position illustrated in FIG. 5.

It is further apparent from FIG. 4 that the drinking mouthpiece 1 comprises an elevated edge 17 extending beyond the membrane 4, which serves to protect the membrane and, at the same time, is designed as a spacer element to prevent the membrane 4 from projecting beyond the edge 17 even in its outwardly curved, open position (cf. FIG. 5). Thus, access to the membrane 4 is rendered difficult such that an undesired resnapping of the membrane will be further complicated.

FIG. 5 shows the membrane 4 under a compression force externally applied perpendicular to the longitudinal extension of the drinking mouthpiece 1 in the sense of arrow 18 and automatically resulting from the application pressure of the lips exerted during drinking or sucking, or from an underpressure at the drinking mouthpiece 1 during a drinking or sucking movement. In this case, the membrane 4 resnaps into its outwardly curved, open position releasing the valve opening 15 provided in the membrane supporting element 7 as well as the valve openings 5 of the membrane 4, which are distributedly arranged along a circular line in the jacket surface of the conical membrane 4, whereby liquid or liquid food can be taken through the drinking mouthpiece 1. As soon as underpressure is no longer applied to the outer side of the membrane 4, and the force acting in the sense of arrow 18 does no longer act when the drinking mouthpiece 1 is set off the lips, the membrane automatically snaps back into its closed position shown in FIG. 4 so as to enable liquid or liquid food such as, for instance, milk diet to be readily taken from a liquid container and, at the same time, ensure a drip-free and perfectly sealing valve assembly in a position of non-use.

Figure 6:
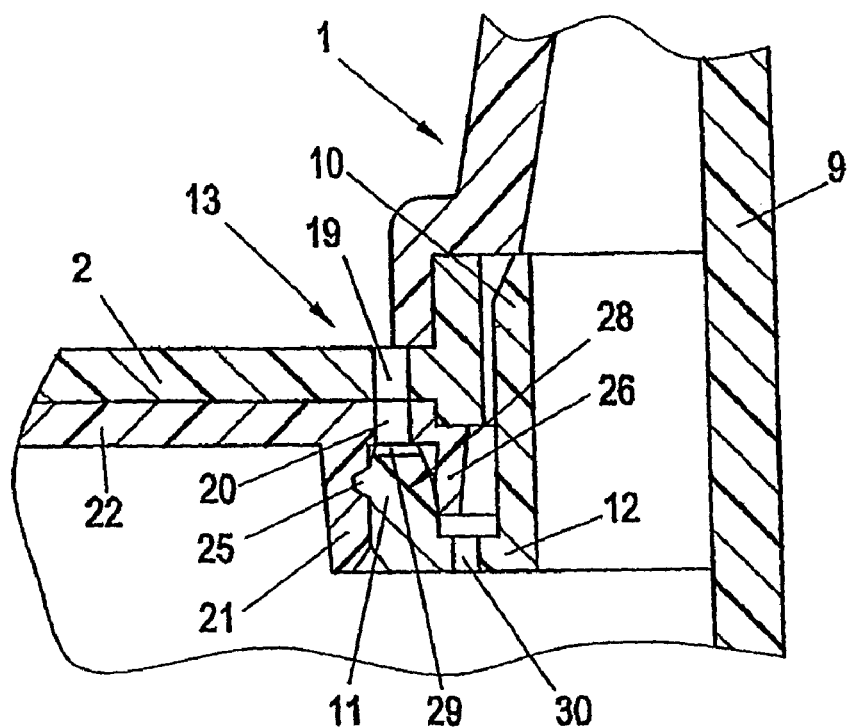
FIG. 6 is a detailed view of a section through the air valve including an annular membrane in its closed position.
Figure 7:
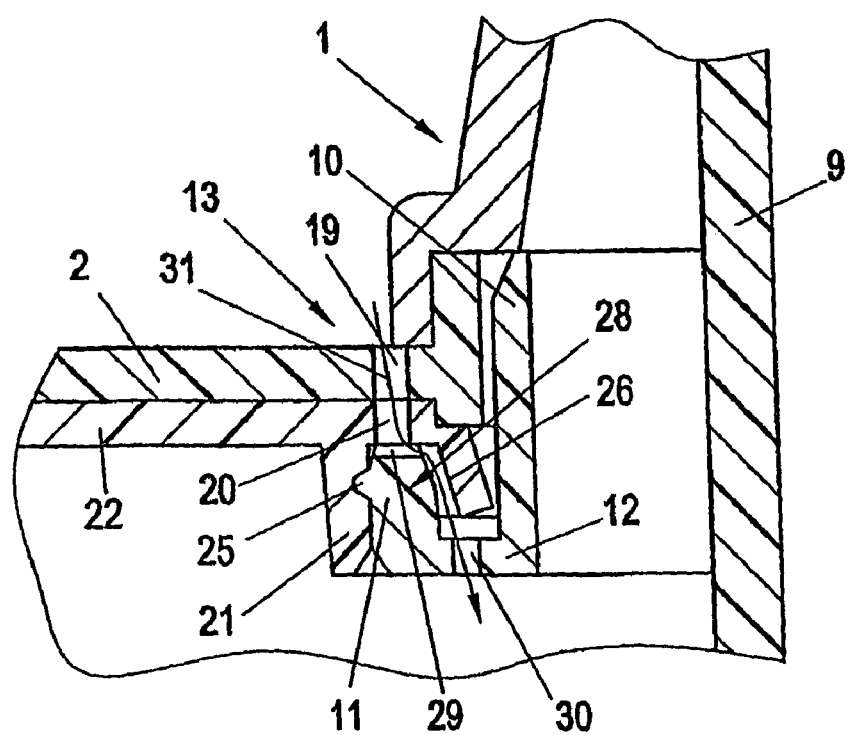
FIG. 7 illustrates a section according to FIG. 6, yet with the annular membrane in its open position.

FIGS. 6 and 7 depict in detail the air valve 13 also apparent from FIGS. 2 and 3, which comprises air passage openings 19 provided in the lid 2, and air entry openings 20 communicating with the former and provided in a reception element 21 (cf. also FIG. 1) which is produced in one piece with the lid 2 via a flange 22 by a two-component injection molding process. The flange 22 is, moreover, surrounded by a sealing ring 23 (cf. FIG. 1), which is provided for the tight closure of the apron-like lid 2 with the bottleneck of a liquid container, the lid 2 being fastened to the bottleneck either by the aid of screws or by a snap-in connection.

The annular reception element 21 comprises a groove 24 (cf. FIG. 1), into which the ring 11 is inserted. The ring 11 comprises on its outer circumference a bead 25, via which the ring 11 can be fastened within the groove 24 of the reception element 21 by a snap-in connection.

In the closed position of the air valve 13 illustrated in FIG. 6, the inner groove wall 26 of the reception element 21, which is designed as an annular membrane, due to its bias lies sealingly against the ring 11 inserted in the groove 24, wherein the inner groove wall 26 comprises thin spots 27 (cf. FIG. 1) to fix its bias and, hence, accordingly determine the residual vacuum present in the position of non-use of a drinking bottle.

If, however, an underpressure is applied at the drinking mouthpiece 1 by the drinking or sucking movement of a user, the annular membrane 26 will be slightly lifted off an end region of the ring 11, which is designed as a sealing cone 28, so that external air will be allowed to enter through the air passage openings 19 provided in the lid 2, the air entry openings 20 provided in the reception element 21 and the recesses 29 provided in the sealing cone 28 in alignment with the air passage openings 19 and the air entry openings 20 (cf. FIG. 7).

In addition, ventilation apertures 30 are provided in the connection flange 12 via which the ring 11 is connected with the fastening ring 10 of the web 9 to fasten the membrane supporting element 7 (cf. FIG. 1), which ventilation apertures register with the air passage openings 19 and the air entry openings 20 in the inserted position of the ring so as to enable the unhampered entry of air into a liquid container in the sense of arrow 31.

Since the insertion of the ring 11 into the groove 24, at the same time, causes the installation of the membrane supporting element 7 in the drinking mouthpiece 1, a largely drip-free liquid container will be obtained when using the lid 2 by combining the air valve 13 with the drinking valve 3, said container being particularly suitable as a dietary aid for administering milk diets.

Figure 9:
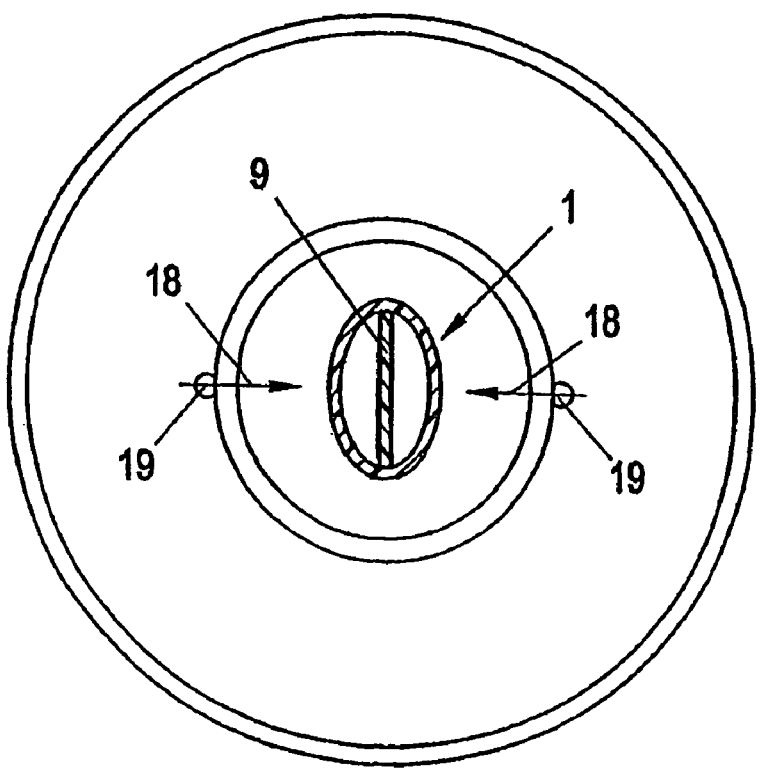
FIG. 9 is a top view on the lid according to FIG. 8, sectioned along line IX-IX of FIG. 2.

From FIGS. 8 and 9 it is, in particular, apparent that the drinking mouthpiece 1 is designed to be oval in top view such that the drinking mouthpiece 1, when in use, can be received by the mouth only in a particular orientation, namely its transversely oval orientation.

As can be taken particularly from FIG. 9, the web 9 of the membrane supporting element 7, in its position received by the mouth, is oriented to be flat between the teeth so as to enable the biting with teeth, or compression, of the soft drinking mouthpiece 1 in the sense of arrow 18 in order to promote the resnapping procedure of the membrane 4 into its open position illustrated in FIG. 5. In addition, the teeth of, in particular, children will be largely protected by the soft drinking mouthpiece 1 in case of a fall, since no direct contact with the substantially stiffer web 9 will occur. Besides, the overall drinking mouthpiece 1 including the web 9 is also flexible in the direction of its smaller axis so as to enable yielding in the event of involuntary, shock-like movements. Furthermore, the stiffer membrane supporting element 7 plus the web 9, fastening ring 10 and ring 11 will also be pressed inwards in case of a fall, since they are inserted in the latch groove 6 of the drinking mouthpiece 1, and the snap-in connection in the groove 24 of the reception element 21, merely by the snap-in connection, which will further reduce the risk of injury due to a fall.

The invention claimed is:

1. A drinking mouthpiece for liquid container, including a valve assembly arranged on a lid including an opening for the passage of liquid, wherein the drinking mouthpiece is substantially elastic and the valve assembly includes a flexible membrane having at least one valve opening and a substantially rigid membrane supporting element having at least one valve opening, wherein the membrane supporting element is supported by a web connected with a fastening ring for securing the membrane supporting element to the lid, wherein the fastening ring is spaced apart from the membrane supporting element in a longitudinal direction of the drinking mouthpiece wherein, with the valve assembly being in a closed position, the membrane rests on the membrane supporting element and the valve opening of the membrane is sealingly covered by the membrane supporting element and the valve opening of the membrane supporting element is sealingly covered by the membrane, the membrane being inwardly curved in said closed position, wherein during the external application of pressure to the drinking mouthpiece and/or the application of an underpressure at the membrane side facing away from the membrane supporting element, the membrane is in a resnapped, outwardly curved open position in which the valve openings of the membrane and membrane supporting element, respectively, are released.

2. A valve assembly according to claim 1, wherein the membrane is substantially conical in its closed and open positions.

3. A valve assembly according to claim 1 wherein the membrane supporting element comprises a valve seat surface substantially corresponding with the inwardly curved shape of the membrane in its closed position.

4. A valve assembly according to claim 1, wherein the drinking mouthpiece comprises a latch groove intended to receive the membrane supporting element configured as a latch body.

5. A valve assembly according to claim 1, wherein the drinking mouthpiece is designed to be substantially oval in top view.

6. A valve assembly according to claim 5, wherein the web used to fasten the membrane supporting element is designed in a plate-shaped manner with the plane defined by the plate-shaped web extending in the direction of the longer axis of the drinking mouthpiece in top view.

7. A valve assembly according to claim 1, wherein the membrane comprises several valve openings arranged along a circular line.

8. A valve assembly according to claim 1, wherein the membrane supporting element comprises a substantially central valve opening.

9. A valve assembly according to claim 1, wherein the mouthpiece, formed as a drinking spout, extends beyond the membrane, whereby an elevated drinking spout edge is formed as a membrane protection and spacer element.

10. A valve assembly according to claim 1, wherein the drinking mouthpiece is made of an elastomer material.

11. A valve assembly according to claim 1, wherein the membrane supporting element is made of polypropylene (PP).

12. A drinking mouthpiece according to claim 1, wherein the soft drinking mouthpiece is produced by a multi-component injection molding process in one piece with the hard lid.

13. A drinking mouthpiece according to claim 1, wherein the lid includes an air valve having an annular membrane and at least one air passage opening, wherein a reception element including a peripheral groove to the inner side of the lid and comprises at least one air entry opening communicating with the air passage opening of the lid and leading into the groove, wherein a ring is insertable or inserted in the groove and the air entry opening is sealed at equal pressures on either side of the air entry opening and at an overpressure at the inner side of the lid, due to the bias of at least one groove wall designed as an annular membrane, and the air entry opening is released at an underpressure at the inner side of the lid.

14. A drinking mouthpiece according to claim 13, wherein the end region of the ring facing the air entry opening of the reception element in the inserted position of the ring is designed to be substantially conical in cross section.

15. A drinking mouthpiece according to claim 13, wherein the end region of the ring facing the air entry opening of the reception element in the inserted position of the ring comprises at least one recess.

16. A drinking mouthpiece according to claim 13, wherein the ring is fixable or fixed in the reception element by the aid of a snap connection.

17. A drinking mouthpiece according to claim 16, wherein the ring comprises on its outer side a circumferential bead for snapping into the groove of the reception element.

18. A drinking mouthpiece according to claim 13, wherein the inner groove wall is designed as an annular membrane.

19. A drinking mouthpiece according to claim 13, wherein the annular membrane comprises at least one thin spot to fix the bias of the annular membrane.

20. A drinking mouthpiece according to claim 13, wherein the fastening ring extending in the direction of the lid opening is connected with the ring via an inwardly extending connection flange.

21. A drinking mouthpiece according to claim 20 wherein at least one ventilation opening is provided in the connection flange.

22. A drinking mouthpiece according to claim 21, wherein the ventilation opening of the connection flange, in the inserted position of the ring, is located adjacent to the inner groove wall designed as an annular membrane.

23. A valve assembly according to claim 10, wherein the drinking mouthpiece is made of a thermoplastic elastomer (TPE).

24. A drinking mouthpiece according to claim 12, wherein the soft drinking mouthpiece is made of a thermoplastic elastomer (TPE), and the hard lid is made of polypropylene (PP).

* * * * *